(12) United States Patent
Joergensen

(10) Patent No.: US 7,168,192 B2
(45) Date of Patent: Jan. 30, 2007

(54) DRIVING DEVICE, PARTICULARLY A LIFTING DEVICE FOR A WORKING VEHICLE

(75) Inventor: Martin Raadkjaer Joergensen, Soenderborg (DK)

(73) Assignee: Sauer-Danfoss (Nordborg) A/S, Nordborg (DK)

( * ) Notice: Subject to any disclaimer, the term of this patent is extended or adjusted under 35 U.S.C. 154(b) by 180 days.

(21) Appl. No.: 10/796,846

(22) Filed: Mar. 9, 2004

(65) Prior Publication Data
US 2004/0194618 A1  Oct. 7, 2004

(30) Foreign Application Priority Data
Mar. 10, 2003  (DE)  ............... 103 10 315

(51) Int. Cl.
*E02F 5/00*  (2006.01)
(52) U.S. Cl. ............................ 37/348; 91/32
(58) Field of Classification Search ............. 37/348; 91/32, 33, 443, 446, 404–409
See application file for complete search history.

(56) References Cited

U.S. PATENT DOCUMENTS

| | | | |
|---|---|---|---|
| 2,780,204 A | 2/1957 | Barley | ............... 121/45 |
| 3,044,266 A | 7/1962 | Svenson | ............... 60/52 |
| 4,622,886 A * | 11/1986 | Imada et al. | ............... 91/520 |
| 5,287,885 A | 2/1994 | Smith | ............... 137/596.17 |
| 2002/0083825 A1* | 7/2002 | Kusuyama | ............... 91/461 |
| 2004/0177749 A1* | 9/2004 | Joergensen | ............... 91/445 |

FOREIGN PATENT DOCUMENTS

| | | |
|---|---|---|
| DE | 3522823 | 1/1987 |
| EP | 0 838 140 A1 | 4/1998 |

* cited by examiner

*Primary Examiner*—Meredith Petravick
(74) *Attorney, Agent, or Firm*—McCormick, Paulding & Huber LLP

(57) ABSTRACT

The invention concerns a driving device, particularly a lifting device for a working vehicle, with a hydraulic drive, in the form of a motor with a first connection and a second connection, a pump, a control valve arrangement between the pump and the drive, and an operating device with at least one operating element with a setting area, with which at least one parameter of the drive can be set. It is endeavoured to provide a simple manner of extending the functionality of the lifting device. For this purpose, it is ensured that the control valve arrangement is optionally controlling the drive to be single-acting or double-acting and the setting area has a first section, in which the drive is controlled to be single-acting and a second section, in which the drive is controlled to be double-acting.

11 Claims, 2 Drawing Sheets

DRIVING DEVICE, PARTICULARLY A LIFTING DEVICE FOR A WORKING VEHICLE

CROSS-REFERENCE TO RELATED APPLICATIONS

This application is entitled to the benefit of and incorporates by reference essential subject matter disclosed in German Patent Application No. 103 10 315.5 filed on Mar. 10, 2003.

1. Field of the Invention

The invention concerns a driving device, particularly a lifting device for a working vehicle, with a hydraulic drive, in the form of a motor with a first connection and a second connection, a pump, a control valve arrangement between the pump and the drive and an operating device, which has at least one operating element with a setting area, with which at least one parameter of the drive can be set.

2. Background of the Invention

In the following, the invention is explained on the basis of a tractor, on which the lifting device exists in the form of a so-called "toolbar" (hitch). On the toolbar, various attachments are fixed, for example a plough, a harrow, a harvester or the like. During operation, this attachment must be kept at a predetermined height, for example to ensure, in connection with a plough, that the ploughshares penetrate sufficiently deep into the earth.

However, for example, the height cannot be fixed. When the tractor leaves the field, the plough has to be lifted. When the tractor changes its driving direction, however, the earth clods still have to be thrown in the same direction, the plough has to be turned and then lowered again. By means of the operating device, it is therefore usually possible to set some parameters, for example, the desired position of the attachment, the lifting speed, the lowering speed and the like.

A lifting device as mentioned in the introduction is known from DE 35 22 823 A1. By means of various control knobs, some parameters can be set. A handle is provided for the lifting and lowering of the toolbar.

In practically all cases occurring in practice, the drive is made to be single-acting, that is, it is configured for lifting the attachment as a load. When the attachment has to be lowered, hydraulic fluid is simply drained off, and the attachment is lowered under the influence of its own weight.

From EP 0 838 140 A1, however, is known a lifting device with a double-acting drive. With this drive, an attachment can be both lifted and lowered.

When the drive is not made to be merely single-acting, that is, merely for lifting, but double-acting, it cannot merely lift or lower a load. When the lifting device reaches the ground, and pressurised hydraulic fluid continues to be supplied to the drive, it can also lift the vehicle. This is expedient, when it is desired to make changes on the wheels lifted from the ground, for, among other things, the fitting of chains, the mounting of twin wheels or the mounting of tools.

The additional effort required for the double-acting control of the drive is relatively small. However, the user is normally only accustomed to single-acting drives, therefore, it is difficult for a user to adapt to different operational characteristics of the lifting device.

Based on the foregoing, it is the general object of the present invention to provide a simple way of extending the functionality of the lifting device.

SUMMARY OF THE INVENTION

With a lifting device as mentioned in the background, improved functionality is achieved in that a control valve arrangement can optionally control the drive to be single-acting or double-acting such that a setting area has a first section, in which the drive is controlled to be single-acting and a second section, in which the drive is controlled to be double-acting.

With this embodiment, the user will encounter relatively few changes when operating the lifting device. In the first section of the setting area, the lifting device is controlled to be single-acting. In this area, practically nothing is changed for the user. Merely, when he moves an operating element further, for example turns it further, he reaches a section of the setting area, the second section, in which the lifting device is controlled to be double-acting. However, since the double-acting section is limited only to a part of the operating element setting area it is less difficult for the user to become accustomed to it. The user will be inclined to test the new functionality. Otherwise, it is not interfering.

Preferably, the first and the second sections are adjoining each other. In this case, a transition between the single-acting operation and the double-acting operation occurs practically seamlessly, when the user displaces the operating element across the border of the first section.

It is also preferable that, the operating element sets the lowering speed of the drive. This is a function, which is well known by the user. The lowering speed is usually set as a percentage of the maximum speed. Now, it can be ensured that the first section, in which the drive is controlled to be single-acting, comprises the major part of the speed area, whereas the second section is only available in a smaller part of the speed area. The adjustment of the lowering speed by the user is usually relatively deliberate. The risk that dangerous situations should occur because of an incorrect operation is comparatively small.

Preferably, the second section is arranged at the end of the setting area, at which the lowering speed is low. This leads to the situation that the drive can only be operated in a double-acting manner, when the lowering speed is low. This is an additional measure for preventing dangerous situations.

In addition, it is also preferable that, the second section have a limit, at which the lowering speed amounts to a maximum of 20% of the maximum lowering speed. The double-acting operation of the drive is thus only permissible, when the lifting device is moving downward at a comparatively low speed. In many cases, the limit will be chosen even lower, for example at 10% or 15%, however, the present invention is not limited in this regard.

In the preferred embodiment of the present invention, the control valve arrangement includes a control valve and a changeover valve. In the first line, the control valve is responsible for the movement direction of the drive. The changeover valve is responsible for the drive being controlled in a single-acting or a double-acting manner. The separation into two valve units makes control simpler.

Preferably, the operating element controls the changeover valve. When the operating element is moved into the second section, the changeover valve is activated so that it operates the drive in a double-acting manner. In this case, pressurised fluid is not only supplied during the lifting of the lifting device, but also during the lowering.

Preferably, the changeover valve is pilot-controlled, and the operating element acts upon a pilot valve. This provides the advantage that the operating element must only be slightly changed relative to traditional operating elements. It merely has to provide the signal output required for controlling the pilot valve.

It is preferred that the control valve forms the pilot valve. In other words, it can be ensured that in certain positions of the control valve, the control valve controls the changeover valve in the desired manner, that is, ensures that the changeover valve sets either the single-acting or the double-acting operation of the drive.

It is preferred that the control valve has a slide with a first position area, in which the change-over valve controls the drive in a single-acting manner, and a second position area, in which the change-over valve controls the drive in a double-acting manner. Thus, the position of the slide is responsible for the drive being controlled in a single-acting or a double-acting manner. The position of the slide can be set by the operating element in a known manner. Thus, modifications of the operating element are not required.

In an alternative embodiment it may be ensured that the changeover valve is a solenoid valve and in the second section the operating element produces a control signal for the solenoid valve. This is a relatively simple way of making the control valve arrangement so that the changeover valve optionally realises the single-acting or the double-acting drive. Particularly, when the operating element is in the form of an electrical signal transmitter, only a few additional elements are required for the realisation of this function.

Preferably, the operating device renders predetermined parameters inactive, when the operating element is in the second section. For example, a lower limitation of the position of the lifting device makes no sense, when it is desired to lower the lifting device further, in order to support it on the ground and subsequently lift the vehicle. In order to avoid further setting measures for the user, such parameters are simply no longer considered, when the operating element has been moved to the second section.

It is also advantageous that a warning display is activated, when the operating element is in the second section. Such a warning display can show the user, that the drive of the lifting device is now double-acting. The warning can be optical, for example a lamp or a LED, or acoustic.

BRIEF DESCRIPTION OF THE DRAWINGS

In the following, the invention is described on the basis of preferred embodiments in connection with the drawings, showing.

DETAILED DESCRIPTION OF THE PREFERRED EMBODIMENTS

Figure 1:
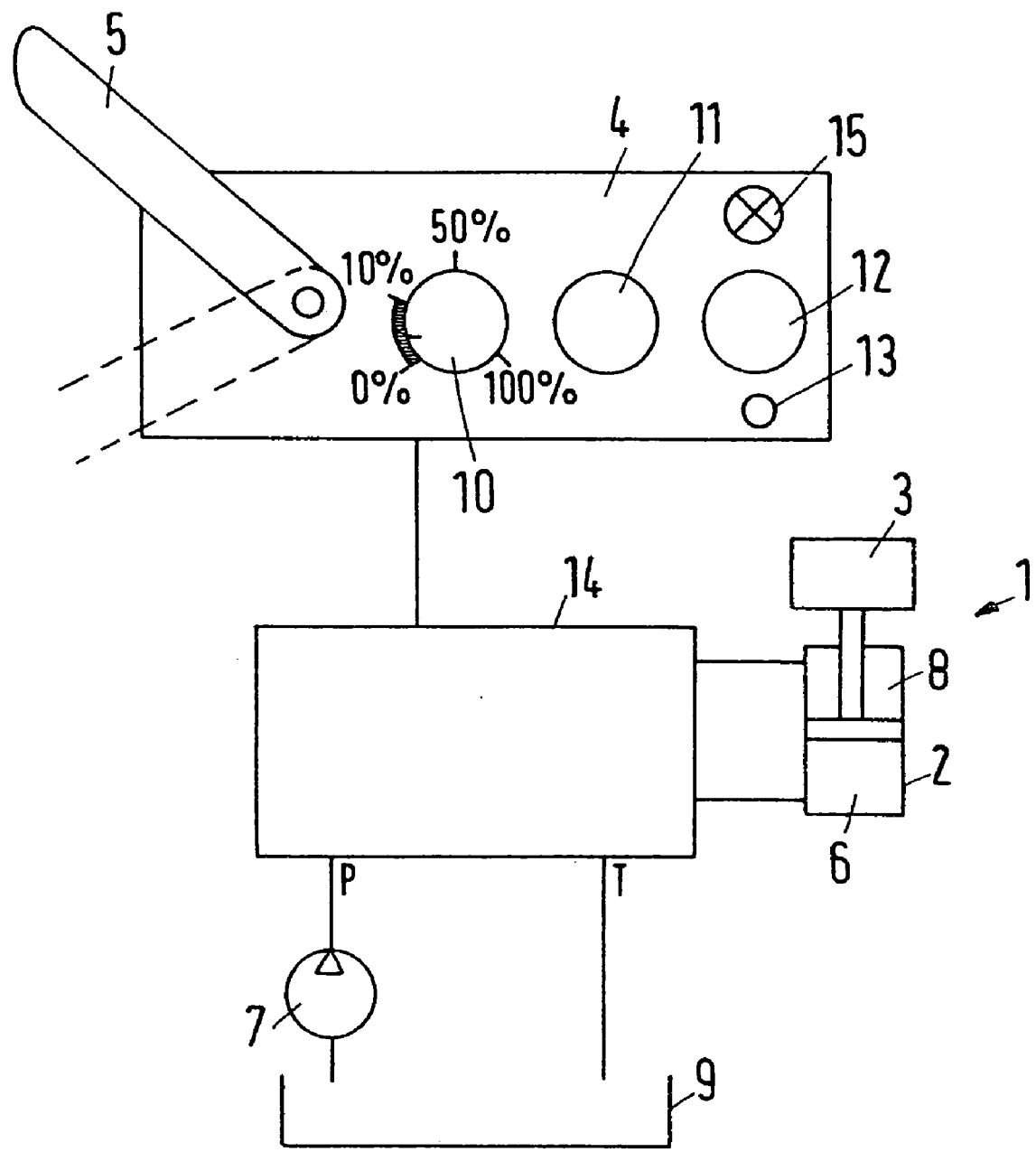
FIG. 1 is a schematic view of a lifting device

FIG. 1 is a schematic view of a lifting device 1 for a working vehicle (not shown in detail), for example a toolbar on a tractor. The lifting device 1 has a motor in the form of a hydraulic cylinder 2, which forms the drive for a schematically illustrated load 3.

An operating device 4 is provided for the control of the cylinder 2. The operating device 4 has several operating elements. One operating element is in the form of a lever 5. When the lever 5 is shifted to the position shown with the full line, the load 3 is lifted. When the lever 5 is in the position shown with the dotted line, the load 3 is lowered.

Usually, the lifting occurs in that a lower pressure chamber 6 of the cylinder is supplied with pressurised hydraulic fluid from a pump 7, whereas fluid is displaced to a tank 9 from an upper pressure chamber 8. During the lowering movement of the load 3, the fluid from the lower pressure chamber 6 is simply discharged to the tank 9. The upper pressure chamber 8 sucks fluid from the tank. As, in this operating mode, a pure driving takes place in one direction, namely upwards, this operating mode is called "single-acting". The lowering of the load 3 practically only occurs under the influence of gravity.

The operating device 4 has further operating elements, namely an operating element 10 for setting the lowering speed, with which the load 3 can be lowered. An operating element 11 is provided for setting a desired position of the load 3, for example a distance from the ground. A further operating element 12 may be provided, to set a maximum lift height for the load 3. Another operating element 13 may be provided for setting the lowest position of the load 3.

In the present case, however, the operating element 10, which is used for setting the lowering speed, has an additional function: For the control of the cylinder 2, a control valve arrangement 14 is provided, which makes it possible not only to control the cylinder 2 in a single-acting manner, so that it can lift a load, but also in a double-acting manner, so that the load 3 can be lowered under the influence of the pressure of a hydraulic fluid. This embodiment has the advantage that, when the load, for example an attachment or the toolbar alone, rests on the ground, and the second pressure chamber 8 of the cylinder 2 is still supplied with pressurised hydraulic fluid, the cylinder 2 can lift the vehicle. Thus, for example, the rear wheels of the tractor used as an example, are raised off of the ground, so that twin wheels can be mounted or chains can be fitted, or other work can be done on the tractor.

The operating element 10 sets a lowering speed between 0% and 100%. 100% means maximum lowering speed.

The operating element 10 also performs a second task, namely, switching between the single-acting operation of the cylinder 2 and the double-acting operation of the cylinder. This switching occurs in that the operating element 10, in the present case having the form of a turning knob, is turned to a speed area, which is for example between 0% and 10%. The upper limit 10% can also be different. Preferably, however, it will not exceed 20%.

The setting area of the operating element 10 from 0% to 100% is divided into one first section, in the present case from 10% to 100%, in which the cylinder 2 is operated in the single-acting mode, and a second section, in the present case from 0% to 10%, in which the cylinder is operated in the double-acting mode. The limitation to the lower lowering speed has the advantage that in the double-acting area of the drive dangers are kept small. The tractor (or another vehicle) is then only lifted with a relatively slow speed, when the cylinder 2 is operated so that its upper pressure chamber 8 is pressurised.

When the cylinder 2 is operated in the double-acting mode, it is of course expedient, when certain parameters, which can be set by the operating device 4, are rendered inactive, for example a lower end position of the drive 2. At the same time, a warning display, for example a lamp 15, can be turned on, when the operating element 10, as shown, is in the second section from 0% to 10% of the setting area of the lowering speed.

A control valve arrangement 14 can be realised in different ways. Two possibilities are shown in the FIGS. 2 and 3.

Figure 2:
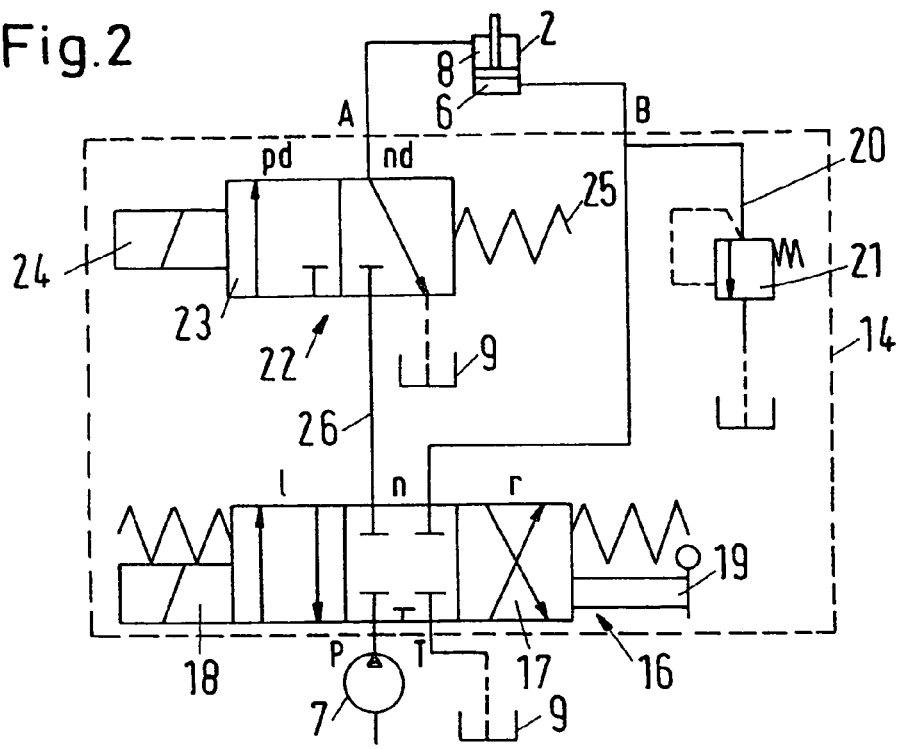
FIG. 2 shows a first embodiment of a control valve arrangement

FIG. 2 shows the control valve arrangement 14 with a pump connection P and a tank connection T, which are connected with the pump 7 and the tank 9, respectively. The control valve arrangement 14 also has two working connections, namely a second connection A, which, for better understanding, is also called lowering connection, and through which the cylinder 2 is supplied with fluid, when the load 3 is lowered, and a first connection B, which, for better understanding, is also called lifting connection, through which the fluid is supplied, when the cylinder lifts the load 3.

The control valve arrangement 14 has a control valve 16 with a slide 17. The position of the slide 17 is controlled by an electromagnet 18, which again is controlled by the operating element 10. Additionally, also a manual handle 19 may be provided for the displacement of the slide 17. This, in the first line, the control valve 16 has the function of a directional valve, however, also serves the control of the movement speed during lifting and lowering.

From a line between the control valve 16 and the lifting connection B, a branch line 20 branches off, in which an overpressure valve 21 is located.

In a line 26 between the control valve 16 and the lowering connection A is located a changeover valve 22, whose slide 23 can also be controlled by an electromagnet 24. The electromagnet 24 works against the force of a spring 25.

In the resting position nd (normal down) shown in FIG. 2 of the slide 23, which is defined by the spring 25, the lowering connection A of the cylinder 2 is immediately connected with the tank 9. A connection between the lowering connection A and the control valve 16 is interrupted.

When, however, the slide 23 is displaced to its other position pd (power down) by the electromagnet 24, the lowering connection A is connected with the control valve 16 via the line 26.

The switching possibility via the changeover valve 22 now leads to the following situation:

When the slide 17 of the control valve 16 remains in the neutral position n shown in FIG. 2, the cylinder 2 remains inactivated.

When, however, the control valve 16 is displaced to its position r (raise), the pump connection P is connected with the lifting connection B, and the cylinder 2 receives pressurised hydraulic fluid in its lower pressure chamber 6. The hydraulic fluid from the upper pressure chamber 8 can flow off via the lowering connection, either through the slide 23 of the changeover valve 22 direct to the tank 9, or, in the position pd of the slide 23, via the line 26 and the slide 17 of the control valve to the tank 9.

When the slide 17 of the control valve is displaced to its position l (lower), the movement behaviour of the cylinder 2 depends on the position of the slide 23 of the changeover valve 22. Firstly, fluid from the lower pressure chamber 6 can flow off to the tank via the lifting connection B and the slide 17 of the control valve 16. In the position nd of the changeover valve 22, fluid for the upper pressure chamber 8 is simply sucked in from the tank 9. In this case, the lowering of the load 3 occurs merely under the influence of its own weight. When, however, the change-over valve 22 is changed over, hydraulic fluid from the pump connection P gets to the line 26 via the slide 17, and from there to the lowering connection A, that is, in this case the cylinder 2 is operated in a double-acting manner and lowers the load 3 under pressure.

For this purpose, it is provided that an electrical switch is available on the operating element 10, which activates the solenoid valve 24 for a changeover of the changeover valve 22, when the operating element selects a lowering speed in the second section from 0% to 10%. In many cases, such a switch is not required, when for example software determines the turning position of the operating element 10 and makes the changeover in dependence of this position.

Figure 3:
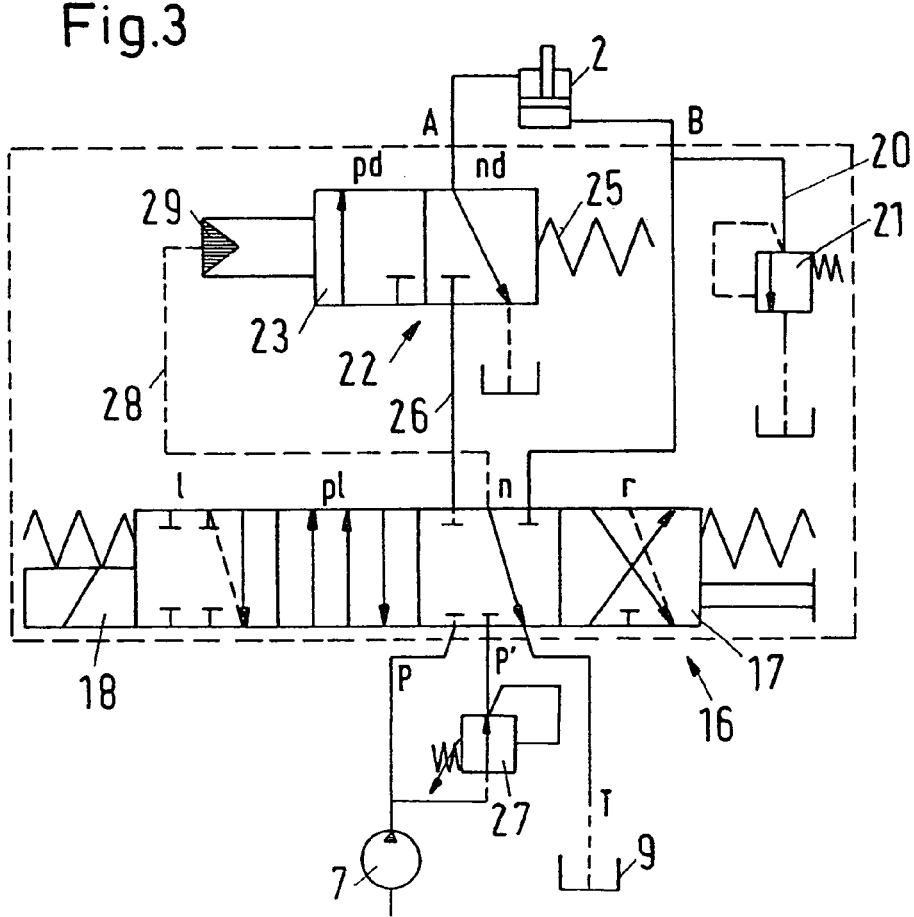
FIG. 3 shows a second embodiment of a control valve arrangement

FIG. 3 shows an alternative embodiment, in which same parts have the same reference numbers. Here, the changeover valve 23 is pilot-controlled via the control valve 16. Further to the positions n, r and l of the slide 17 of the control valve 16, an additional position pl is provided, in which pressurised hydraulic fluid is supplied to a pressure inlet P' from the pump 7 via a flow limiting valve 27. From here, the pressurised fluid reaches a control inlet 29 of the changeover valve 22 via a control line 28. As long as the slide 17 is in the position pl, the pressure at the control inlet 29 exceeds the force of the spring 25, and the slide 23 of the change-over valve 22 is displaced to the position pd, so that pressurised hydraulic fluid can reach the lowering connection A of the cylinder 2 directly via the pressure inlet P and the line 26.

In the neutral position n, the lifting position r and the lowering position l, however, the control line 28 can be connected with the tank connection T, so that by means of the spring 25 it can be ensured for certain that the slide 23 of the changeover valve 22 remains in the position nd.

With this embodiment, the position of the slide 17 is simply set via the electromagnet 18, in that the operating element 10 is set at a desired lowering speed. With a correspondingly low lowering speed, the double-acting operation of the cylinder 2 will then automatically be chosen.

Several deviations from the embodiments shown can be imagined. Also with the embodiment in FIG. 2, the changeover valve 22 can be pilot-controlled, and a valve can be provided in a control line acted upon by the pressure inlet P, said valve opening or closing the control line. In the line to the lifting connection B, a pilot-controlled non-return valve may be provided, which opens from the control valve 16 to the lifting connection B and can be opened by a pressure at the lowering connection A or in front of the change-over valve 22, when the cylinder 2 is to lower the load 3.

There are also other possibilities of designing the operating element 10. For example, the position 0 can be located in the middle of the rotation area. A deflection to 100% lowering speed in the single-acting mode then occurs through a rotation to the one side and in the double-acting mode to the other side. Of course, the double-acting lowering speed can be limited by suitable software measures, if required.

What is claimed is:
1. A driving device comprising:
a hydraulic drive, in the form of a motor with a first connection and a second connection;
a pump;
a control valve arrangement between the pump and the drive; and
an operating device, having at least one operating element with a setting area, with which at least one parameter of the drive can be set;
wherein the control valve arrangement controls the drive to be at least one of single-acting and double-acting, the setting area having a first section, in which the drive is controlled to be single-acting and a second section, in which the drive is controlled to be double-acting; and
wherein the operating element sets the lowering speed of the drive.

2. The device according to claim 1, wherein the first and the second sections are adjoining each other.

3. The device according to claim 1, wherein the second section is arranged at the end of the setting area, at which the lowering speed is low.

4. The device according to claim 3, wherein the second section has a limit, at which the lowering speed amounts to maximum 20% of the maximum lowering speed.

5. The device according to claim 1, wherein the control valve arrangement has a control valve and a changeover valve.

6. The device according to claim 5, wherein the operating element controls the changeover valve.

7. The device according to claim 6, wherein the changeover valve is pilot-controlled, and the operating element acts upon a pilot valve.

8. The device according to claim 7, wherein the control valve forms the pilot valve.

9. The device according to claim 6, wherein the changeover valve is a solenoid valve and in the second section the operating element produces a control signal for the solenoid valve.

10. A driving device comprising:
a hydraulic drive, in the form of a motor with a first connection and a second connection;
a pump;
a control valve arrangement between the pump and the drive; and
an operating device, having at least one operating element with a setting area, with which at least one parameter of the drive can be set;
wherein the control valve arrangement controls the drive to be at least one of single-acting and double-acting, the setting area having a first section, in which the drive is controlled to be single-acting and a second section, in which the drive is controlled to be double-acting; and
wherein the operating device renders predetermined parameters inactive, when the operating element is in the second section.

11. A driving device comprising:
a hydraulic drive, in the form of a motor with a first connection and a second connection;
a pump;
a control valve arrangement between the pump and the drive; and
an operating device, having at least one operating element with a setting area, with which at least one parameter of the drive can be set;
wherein the control valve arrangement controls the drive to be at least one of single-acting and double-acting, the setting area having a first section, in which the drive is controlled to be single-acting and a second section, in which the drive is controlled to be double-acting; and
wherein a warning display is activated, when the operating element is in the second section.

* * * * *